Figure 1:
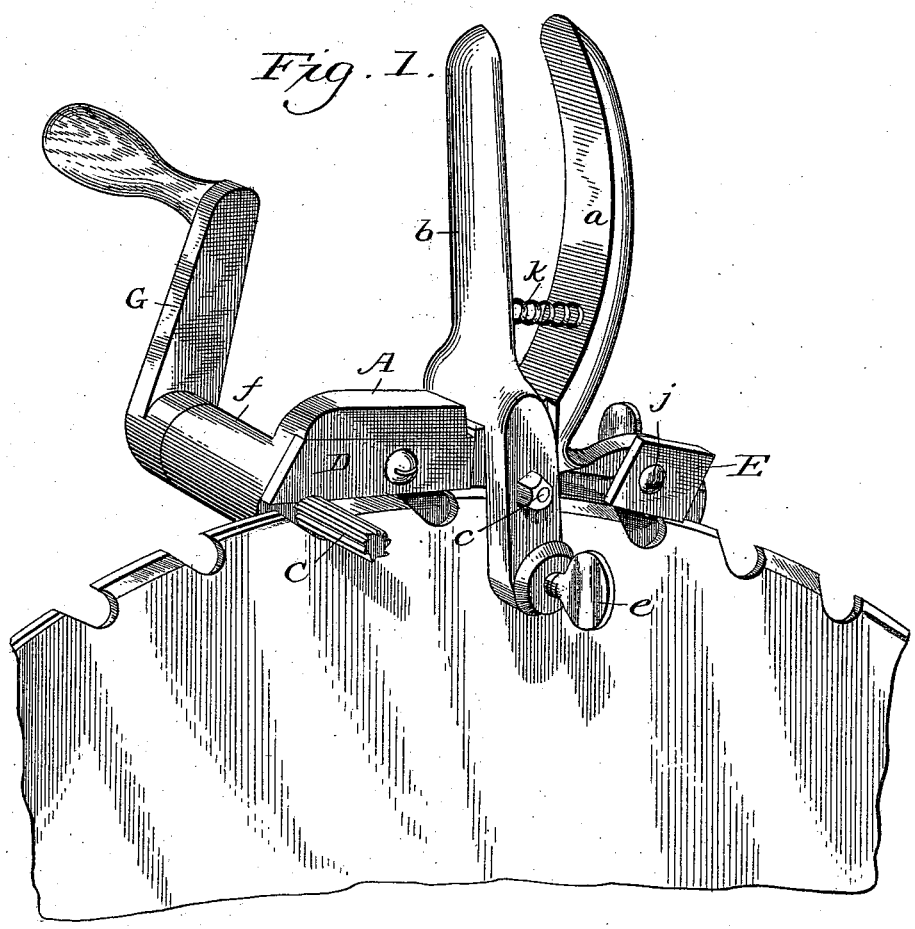

(No Model.)  C. H. DOUGLAS.  2 Sheets—Sheet 1.
SAW SHARPENER.

No. 555,567. Patented Mar. 3, 1896.

Witnesses

Inventor
Charles H. Douglas (No Model.) 2 Sheets—Sheet 2.
C. H. DOUGLAS.
SAW SHARPENER.
No. 555,567. Patented Mar. 3, 1896.
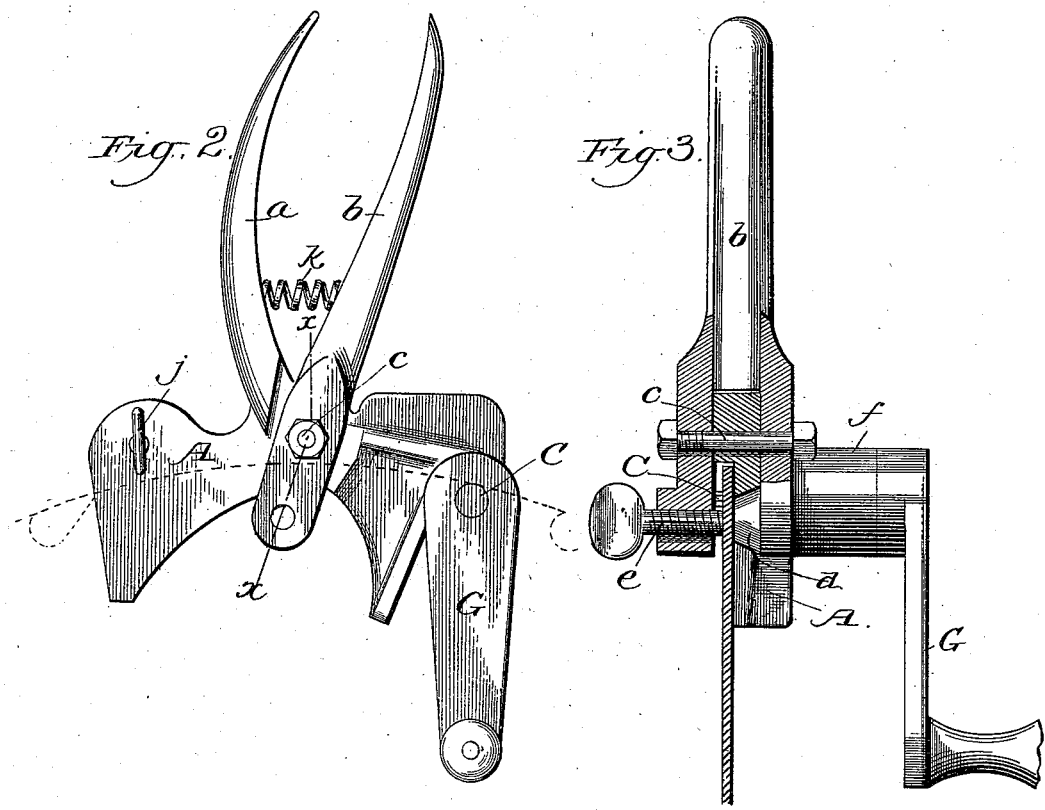
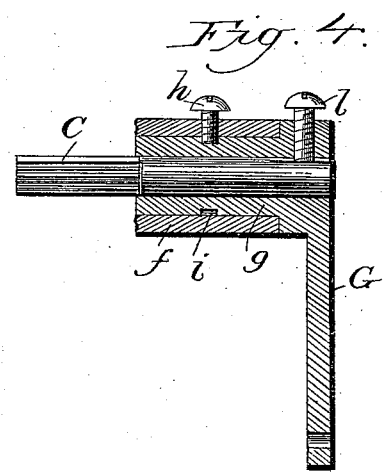
Witnesses
Inventor
Charles H. Douglas

UNITED STATES PATENT OFFICE.

CHARLES H. DOUGLAS, OF CHICAGO, ILLINOIS.

SAW-SHARPENER.

SPECIFICATION forming part of Letters Patent No. 555,567, dated March 3, 1896.

Application filed July 16, 1895. Serial No. 556,193. (No model.)

*To all whom it may concern:*

Be it known that I, CHARLES H. DOUGLAS, residing at Chicago, in the county of Cook and State of Illinois, have invented certain new and useful Improvements in Saw-Sharpeners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved machine or implement for sharpening the teeth of saws, and is especially adapted to that form of teeth that makes a chisel-cut. It is fully illustrated in the accompanying drawings, in which—

Figure 1 is a perspective view of the implement in position for sharpening one of the teeth of a circular cutter-saw. Fig. 2 is a side elevation thereof. Fig. 3 is a sectional view on line $x$ $x$, Fig. 2. Fig. 4 is a section of a portion of the socket and crank in which the sharpening-cutter is secured.

Similar letters refer to similar parts throughout the several views.

A is a frame, of metal or other suitable material, on which there is a permanent handle $a$.

$b$ is a movable handle, which is pivoted to the frame A at $c$ and is bifurcated at its lower end for the purpose of striding the saw-blade a little below said frame. On one of the forks of the movable handle is a projection $d$, which rests against the saw-blade. There is a thumb-screw $e$, which passes through the other part directly opposite the projection $d$, for the purpose of clamping the saw-blade between the two.

There is a projection $f$ upon one side of the frame A, which forms a socket in which a corresponding projection $g$ on the crank G is fitted and made to revolve and is held in the socket by a screw $h$, which extends into an annular groove $i$ in the crank projection $g$. In this crank projection $g$ the cutter C is secured by set-screw $l$.

Secured to frame A is a plate of hard metal D, that rests upon the outside or back of the tooth to be sharpened, and the top of the cutter C is sufficiently above the bottom of plate D to give the desired angle to the cutting-point of the tooth. This is accomplished preferably by letting the cutter C into the plate D the proper distance.

E is an adjustable plate, which rests upon the rear teeth of the saw for the purpose of bringing the sharpening-cutter in proper relation to the tooth to be sharpened. The screw $j$ secures the plate E is position, and the edges of the plate are different distances from the screw, so that the plate can be secured with the side down, which will elevate or depress the rear end of the frame A to the desired position. The handles are held apart by a spring $k$. The cutter C should be made to revolve as close as possible against the plate D to avoid turning up a bur on the cutting-point of the tooth while sharpening.

The relative position of the cutter C to the plate D regulates the angle of the cutting-point of the tooth when sharpened, and thus if the cutter is placed far above the top of the tooth the angle of the cutting-point is dressed obtuse, and if but little above the angle of the cutting-point is dressed more acute.

Cutter C can be adjusted endwise to bring other parts into use when one part gets dull.

In operation the tool is placed upon the saw in position illustrated in Fig. 1, with the plate D resting upon the tooth to be sharpened and the cutter C at the front end or throat. Thumb-screw $e$ is then set up against the saw-blade, so as to clamp it tightly against the projection $d$ on the opposite fork. Then by pressing handles $a$ and $b$ toward each other the cutter C is brought against the front of the tooth. Then by revolving the cutter by means of crank G the metal on the front of the tooth is cut away until the tooth is brought to a sharp cutting-point, after which the thumb-screw $e$ is loosened and the tool is removed to the next tooth that requires sharpening.

With this instrument a saw may be sharpened in a few minutes without removing it from the arbor. A permanent shoulder or rib may be made on the frame A to rest upon the top of the tooth and serve in the place of plate D; but the plate is preferred, because it is more easily hardened and adjusted to the cutter, and in case a different-sized cutter may be required a different plate may be put on to match it.

Minor changes can be made in the construction of the several parts without departing from the nature of my invention.

What I claim as my invention, and desire to secure by Letters Patent, is—

1. In a machine for sharpening the teeth of saws, the combination with the main frame, of the plate D attached thereto and arranged to rest upon the back of a tooth; the cutter C, constructed to fit the circularly-grooved face or front of the tooth and arranged to act in conjunction with said plate D in removing the metal from the point of the tooth, thus giving the required angle to the point of the tooth, and avoiding the formation of a bur on the cutting-point; and means for keeping the cutting-tool up to its work while in operation, substantially as described.

2. In a machine for sharpening saws, the combination with a main frame, of plate D, the cutter C, co-operating with said plate, and movable handle $b$, pivoted to the main frame, and provided with the forked end, one fork having the projection $d$, and the other the thumb-screw $e$, substantially as specified and described.

3. In a machine for sharpening saws, the combination with the main frame, of plate D, cutter C, movable handle $b$, provided with the clamping device; and the adjustable plate E, mounted eccentrically upon the main frame, substantially as described.

In testimony whereof I affix my signature in presence of two witnesses.

CHARLES H. DOUGLAS.

Witnesses:
J. W. REYNOLDS,
FRANK W. WALQUIST.